US007108890B2

(12) United States Patent
Horne et al.

(10) Patent No.: US 7,108,890 B2
(45) Date of Patent: Sep. 19, 2006

(54) NATURAL-APPEARING, PENETRATING, INK SUBLIMATION PRINTING PROCESS

(75) Inventors: John Walter Horne, Provo, UT (US); George Evan Bybee, Orem, UT (US)

(73) Assignee: Basic Research, L.L.C., Salt Lake City, UT (US)

( * ) Notice: Subject to any disclaimer, the term of this patent is extended or adjusted under 35 U.S.C. 154(b) by 0 days.

(21) Appl. No.: 10/434,036

(22) Filed: May 8, 2003

(65) Prior Publication Data

US 2004/0069172 A1  Apr. 15, 2004

Related U.S. Application Data

(63) Continuation-in-part of application No. 10/271,213, filed on Oct. 15, 2002, now abandoned.

(51) Int. Cl.
*B05D 1/28* (2006.01)
*B05D 1/36* (2006.01)

(52) U.S. Cl. .................................. 427/258; 427/287

(58) Field of Classification Search ................ 427/258, 427/287
See application file for complete search history.

(56) References Cited

U.S. PATENT DOCUMENTS

| | | | | |
|---|---|---|---|---|
| 4,058,644 A | * | 11/1977 | DeVries et al. | |
| 4,292,397 A | * | 9/1981 | Takeuchi et al. | ............ 430/303 |
| 4,354,851 A | * | 10/1982 | Hix et al. | ........................ 8/471 |
| 5,534,352 A | * | 7/1996 | Pittman et al. | ............. 428/535 |
| 6,686,315 B1 | * | 2/2004 | Creed | |

* cited by examiner

*Primary Examiner*—Fred J. Parker
(74) *Attorney, Agent, or Firm*—Morriss O'Bryant Compagni

(57) ABSTRACT

A new and improved process for printing a durable image prepared from sublimable inks on a substrate of natural or synthetic materials by first providing the substrate with a transparent polymeric top coating formed from an acrylic polyol or isocyanate resins or mixtures thereof and transferring onto the substrate the image formed from sublimable inks by sublimation.

27 Claims, 10 Drawing Sheets

NATURAL-APPEARING, PENETRATING, INK SUBLIMATION PRINTING PROCESS

RELATED APPLICATIONS

This patent application is a continuation in part of U.S. Ser. No. 10/271,213, filed on Oct. 15, 2002 (now abandoned) and directed to a Natural-Appearing, Penetrating, Ink Sublimation Printing.

THE FIELD OF THE INVENTION

This invention relates to ink sublimation processes and, more particularly, to novel systems and methods for sublimating ink onto various substrates.

BACKGROUND

Ink sublimation techniques are known within the printing industry. Ink sublimation refers to the process by which specialized inks are forced (by pressure, heat, diffusion, or some other means) into the open pores of a heated polymerized material. Once the polymeric material is cooled, the pores close, leaving the ink fused or amalgamated into the polymeric material. Ink sublimation processes result in very durable, wear-resistant, scratch-resistant prints since the ink is projected from within the polymerized material. In effect, the polymer is "tattooed" with ink. Printing, using ink sublimation techniques on polymers, can be overlaid on various substrates, including glass, metal, wood, stone, plastics, ceramics, and the like. After adhering an appropriate polymer to the surface thereof, sublimating appropriate inks or dyes into the polymer produces an image.

Using ink sublimation techniques on porous or stoney materials, such as stone, brick, concrete, or the like gives rise to several issues. First, polymers typically used within the masonry industry are sealants giving stone a lacquered or varnished look, thus making the stone appear unnatural. None of the traditional known polymers have proven suitable for maintaining the stone or masonry in a naturally appearing state, while accepting an image. Moreover, polymers traditionally applicable to stone or other masonry may insufficiently penetrate the stone surface, thereby providing an insufficient level of durability. Thus, ink sublimation images using traditional masonry polymers may only reside superficially upon the polymer lacquer and not penetrate the stone's surface. Thus, image and polymer may be easily worn or scraped away.

Images may be applied to a variety of items to increase their artistic appeal and appearance. Images intended for mere viewing or used in accordance with applications subjected to light wear may not require excessive durability. However, in certain stone and masonry applications that endure frequent wear, weather, and cleaning, methods and materials are needed to print durable images for applications such as stone counter tops, flooring, furniture, walls, steps, monuments, tombstones, statues, handrails, bathtubs, and the like. The traditional masonry polymers used are insufficient in this regard, do not penetrate the stone face, do not embed an image into the stone face, and may be easily worn from the surface thereof, thereby providing an unacceptable level of durability.

What is needed is a new class of polymers and techniques that may be applied to various materials such as stone and other masonry materials, while being imperceptible to a viewer, thereby maintaining the stone's natural appearance.

What is further needed is a polymer and method that sufficiently penetrates the stone surface and accepts a sublimated image penetrated into the stone, thereby providing durable prints that may not be easily worn from the stone's surface, since they are subsurface images and wear only at the same rate as the stone or masonry surface.

SUMMARY

In view of the foregoing, it is an object of the present invention to provide an ink sublimation process that may be used to penetrate into the surface of the material a durable embedded image while leaving the material with a natural appearance.

In accordance with this invention, we have discovered a new and improved process for printing a durable image on a substrate which substrate can be composed of natural materials or synthetics such as plastics. The process of this invention will provide a durable printed image on the substrate while leaving the substrate with a natural appearance. In accordance with this invention, a transferable sublimable ink image prepared from sublimable inks is provided on a transferable image transfer sheet. In accordance with this invention, the substrate to be printed upon is provided with a transparent polymeric top coating formed from a resin selected from the group consisting of acrylic polyols and isocyanate resins, or mixtures thereof. The image transfer sheet containing the transferable sublimable ink image formed by sublimable inks is contacted with the coating on the coated surface of the substrate to be printed upon. Thereafter, the sublimable ink of the image on the transfer sheet is allowed to transfer into the coating by sublimation so that the image becomes printed on the substrate. In this manner, the image is transferred so that the substrate has a durable printed image embedded therein while having a natural appearance. In accordance with this invention, the printed image is provided to the substrate, which image can not be easily worn from the surface of the substrate and will wear only at the same rate as the surface of the substrate itself.

By utilizing this method, both natural and synthetic materials can be used as substrates and printed to provide a durable printed image. In accordance with this invention, any-type of synthetic plastics can be printed through the method of this invention. Concerning natural materials, there may be included stone or masonry surfaces, marble, glass, brick, concrete, wood, metal, ceramics, wood composites, leather, rubber and fiber glass. In accordance with this invention, the image becomes embedded in the substrate and does not discolor over time. The image is provided to the substrate with clarity and a natural appearance. Furthermore, the image is not eroded from the substrate, i.e. by the effects of weather, abrasion or UV radiation, but simply erodes at the same rate as the image receiving surface.

BRIEF DESCRIPTION OF THE DRAWINGS

The foregoing and other objects and features of the present invention will become more fully apparent from the following description, taken in conjunction with the accompanying drawings. These drawings depict only typical embodiments of the invention and are, therefore, not to be considered limiting of its scope. The method of this invention will be described with additional specificity and detail through use of the accompanying drawings in which.

DETAILED DESCRIPTION

Figure 1:
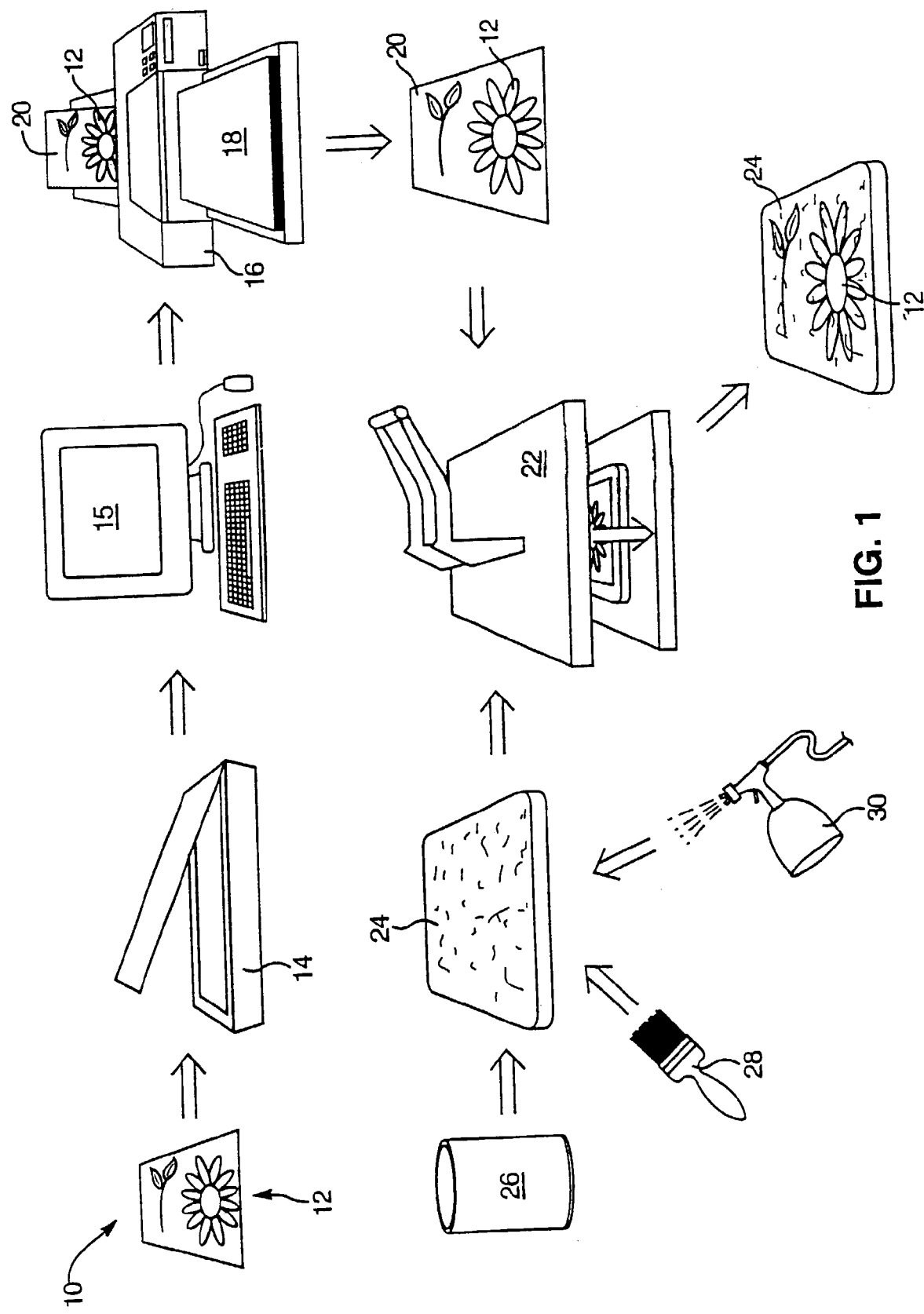
FIG. 1 is a flow chart illustrating one embodiment of a process whereby printed images of sublimation inks may be transferred onto a substrate material, such as stone or masonry.
Figure 2:
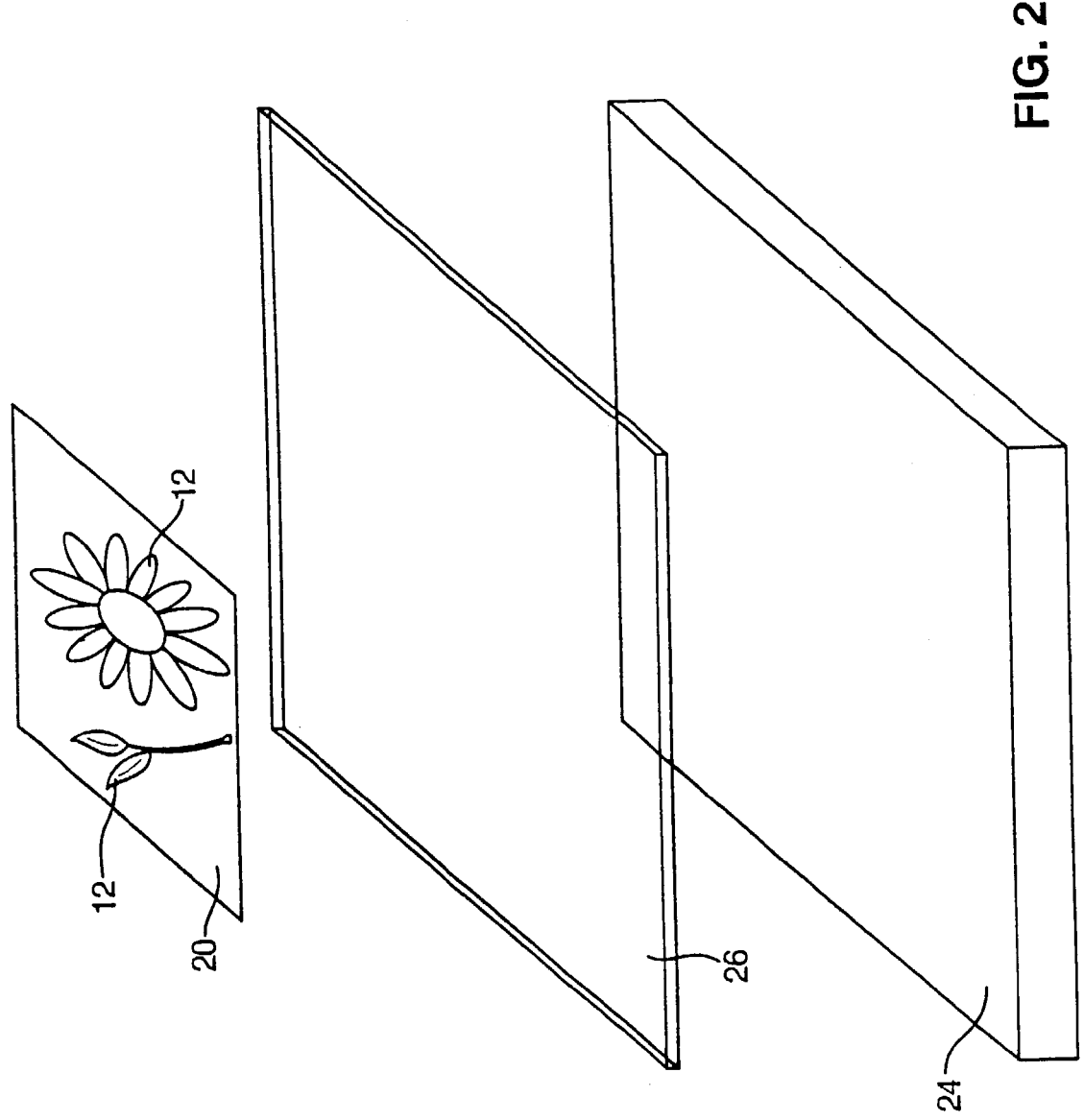
FIG. 2 is a perspective view of an ink substrate, polymer, and stone layers in accordance with the present invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 10, is not intended to limit the scope of the invention, but is merely representative of certain presently preferred embodiments of the invention.

In accordance with this invention, there is provided a process for printing a durable image on substrates which include both natural and synthetic materials. This process comprises providing a transferable sublimable ink transfer sheet containing on its surface the image desired to be printed, which image is formed from sublimable inks. This image is printed in accordance with this invention on a substrate where the substrate's surface has been first provided with a transparent polymeric top coating formed from a resin selected from the group consisting of acrylic polyol resins, isocyanate resins and mixtures thereof. In accordance with this invention, the coating on the coated surface of the substrate is contacted with the surface of the transfer sheet bearing the sublimable ink image to be printed. Printing on the desired substrate is accomplished by allowing said sublimable ink forming the image on the transfer sheet material to transfer by sublimation to the top coating of the substrate so that the inks within the design are printed on the substrate.

Printing by means of sublimable ink is well known. Sublimable inks are inks which are sublimed by heating. In accordance with this invention, transfer is achieved by sublimation. By contacting the coated substrate with the transfer sheet having the printed sublimable ink image and allowing these sublimable inks to sublimate, the image is transferred from the sheet to the substrate.

In accordance with this invention it has been found that transparent polymers prepared from resins selected from the group consisting of acrylic polyols and isocyanate resins produce a coating which allows the sublimable inks to penetrate therein and reach the surface of the substrate. Generally these transparent polymers have been used in the automotive finishing industry. However it has been discovered that these polymers provide for printing on various substrates to produce a natural appearance of both the design and the substrate. This is done without altering the appearance of the substrates. In addition, it is through the use of these polymers that hard to print surfaces, especially the natural surfaces, such as stone, masonry, ceramics, marble, etc., as well as the synthetic plastic materials, can be printed with a durable weather resistant print. These products provide UV protection and prevent discoloration or weathering of the printed image on the natural or synthetic substrate. It is through the unique properties of these polymers that the natural appearance of the substrate is maintained substantially unaltered except for the sublimable image. It has been found that these polymers permit penetration of the sublimable inks into the pores of the natural or synthetic substrate to allow these substrates to accept a printed image in durable form.

In accordance with this invention, it has been found that any of the conventional acrylic polyol resins or isocyanate resins (polyurethane resins) or mixtures thereof which produce, upon curing, a transparent coating can be used in forming the printed substrates. These resins are used for automotive finishing as an automotive top coat. Conventional acrylic polyols and polyurethane resins for use in coating the substrates for printing in accordance with this invention are found in Martz et al., U.S. Pat. No. 5,066,733 issued Nov. 19, 1991; Stengel et al., U.S. Pat. No. 5,545,824 issued Aug. 13, 1996; Singer, et al., U.S. Pat. No. 5,814,410, issued Sep. 29, 1998 and Natesh, U.S. Pat. No. 5,739,194, issued Apr. 14, 1998.

The acrylic polymers can be inter-polymers of about 0.2 to about 30 percent by weight hydroxy-arcylate monomers such as hydroxyalkyl acrylate and methacrylate having 2 to 6 carbon atoms in the alkyl group and from about 70 to about 99.8 percent by weight of other ethylenically unsaturated copolymerizable materials such as alkyl acrylates and methacrylates, the percentages by weight being based on the total weight of the monomeric charge. Examples of suitable hydroxyalkyl acrylates and methacrylates are acrylic acid and methacrylic acid esters of ethylene glycol and propolene glycol. Also useful are hydroxy-containing esters and/or amides of unsaturated acids such as maleic acid, fumaric acid, itaconic acid and the like.

Examples of suitable alkyl acrylates and methacrylates are lauryl methacrylate, 2-ethylhexyl methacrylate and n-butyl acrylate. Besides the acrylates and methacrylates, other copolymerizable monomers which can be copolymerized with the hydroxyalkyl acrylates and methacrylates are ethylenically unsaturated materials such as monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alkyl or aryl isocyanates, alpha-methyl styrene, alpha-methyl chlorostyrene, vinyl butyrate, vinyl acetate, allyl chloride, divinyl benzene, diallyltaconate, triallyl cyanurate and mixtures thereof. Usually these other ethylenically unsaturated materials are used in admixture with the above-mentioned acrylates and methacrylates.

Among the particularly preferred resins for use in this invention are the acrylic polyols which are cross linked with an isocyanate such as disclosed in Stengel et al., U.S. Pat.

No. 5,545,824 issued Aug. 13, 1996. In accordance with a preferred embodiment of this invention, the film forming acrylic polyol is formed by curing an acrylic polyol resin with an isocyanate resin. The isocyanate should be capable of reacting with the active hydrogens in the acrylic polyol to give a thermosetting coating. The composition is typically a two package composition with the isocyanate resin in one package and the polyol in a separate package, the two packages being mixed just prior to application.

Examples of the isocyanates used in this curing composition are monomeric aliphatic isocyanates such as 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful polyisocyanates are the isocyanurate from isophorone isocyanate commercially available from Hüls America as T1890 and the biuret from 1,6-hexamethylene diisocyanate commercially available from Miles, Inc. as DESMODUR N 3300, a triisocyanurate also available from Miles, Inc.

In accordance with the particularly preferred embodiment of this invention the polymer utilized to coat the substrate is a polymer formed by curing the pre-polymer composition distributed by PPG Industries and identified as "Flexed 'N' Flat" (DCU 2060). The polymer produced upon curing this composition is an acrylate polyol cross linked with a polyisocyanate. The composition of Flexed 'N' Flat (DCU 2060) is in accordance with the curing compositions disclosed in U.S. Pat. No. 5,545,824. In accordance with the preferred embodiment, this composition containing separate components, one being the acrylate polyol and the other being the isocyanate, is coated on the substrate as a liquid composition, such as described in U.S. Pat. No. 5,545,824, by any conventional means such as, spraying, brushing, dipping, hot melting, solvent binding, etc.

In general, these acrylic polyol coatings contain an ultraviolet light stabilizer and a metal catalyst for promoting the curing of the resin components which consist of the acrylic polyol and the isocyante. Upon application to the substrate, the liquid coating, when cured, forms a solid polymeric coating. Curing can take place either by allowing the applied composition to stand at room temperature or stand at elevated temperatures for a sufficient period of time to cure the resin and form the solid polymeric coating. In general, temperatures from 20° C. to 60° C. can be utilized to cure the resin and form the polymeric coating. However, in order to speed the process generally, heating is applied at temperatures of about 40° C. to 60° C. These coatings allow the sublimable inks to penetrate into the pores of the substrate and allow the substrate to accept a sublimated image, which may be fused or impeded into substrate. In addition, these polymers provided a very hard, very durable surface for the substrate and also provide UV protection and prevent discoloration or deterioration of the image through various means such as weathering.

If desired the substrate may be coated with another polymer prior to coating with the acrylic polyol or isocyanate resin or mixtures thereof, which are utilized in the method of this invention. However, it is important that the acrylic polyol and/or isocyanate resin to form the top coat of said substrate and be allowed to contact the sublimable ink print on the transfer sheet.

In accordance with this invention, the transfer sheet can be formed from any conventional material utilized for transferring sublimable inks. These include cloth, canvass, plastic, plastic goods, paper, wood, leather, glass earthenware and metal. Generally it is preferred that these transfer sheets be made of paper. The image to be printed can be formed from the sublimable inks by printing these images onto the transfer sheet by any conventional method such as by digital printing and normal printing. The inks used can be of various colors to colorize the image in one or more colors. In accordance with this invention, by this method, these colors will be reproduced on the final substrate.

Any conventional method of forming an image on a transfer layer or transfer sheet can be utilized in accordance with invention. In the final step of this process, the coating on the coated sheet is contacted with the surface of the transfer sheet containing the sublimable ink image to be printed. While this contact is maintained, the sublimable ink on said image of the transfer material is allowed to transfer by sublimation to the substrate so that the image is printed on the substrate. In accordance with this step, any conventional method of sublimation can be used for transferring the image from the transfer sheet to the substrate. Sublimation techniques which can be utilized involve forcing the subliminal inks by pressure, heat, diffusion, or some other means, or combinations thereof, into the open pores of a heated polymerized material. Generally the substrate is made of porous material and transfer is made under conditions of temperature and pressure which allow the pores of said substrate to open so that the sublimable inks which form the image can penetrate into the substrate. It is apparent that the precise temperature utilized will best be determined by the particular substrate itself. However, in general, temperatures from about 70° C. to 150° C. are utilized. However, for plastic surfaces it is generally preferred to utilize lower temperatures, i.e., 70° C. to 160° C. When the substrate is a natural substrate such as glass, stone, masonry, ceramics, tile or marble, it is preferred to utilize higher temperatures, i.e., from 150° C. to 250° C.

In accordance with an embodiment of this invention, after the printing is carried out and the image is transferred to the substrate through the polymeric coating, another polymeric coating can be added if desired.

In accordance with this invention specific embodiments are disclosed by reference to the attached drawings.

The embodiments of the invention will be best understood by reference to the drawings, wherein like parts are designated by like numerals throughout.

Referring to FIG. 1, a process 10 for printing images on substrates may include acquiring a desired image 12 or images 12, including but not limited to photographs, illustrations, paintings, and the like. The image 12 may be chosen from a wide variety of patterns or designs. Simple images 12 or very complex and intricate images 12 may be used in accordance with the invention and may be transferred to a substrate material.

In certain embodiments, an image 12 may be converted into a computer-readable format for manipulation and editing. For example, an image 12 may be converted into a computer-readable format with a scanner 14. In other embodiments, digital cameras may be used to capture an image 12 and convert the image 12 into a format usable by a computer 15.

A computer 15 may be used to edit images before being transferred to a transfer substrate 20. A host of different editing applications may be used, such as Photoshop, Paint Shop Pro, and the like, to enlarge, shrink, trim, and enhance photographs. The computer 15 may also be used to transmit the image 12 to a printer 16 in order to print the image 12 onto a transfer sheet 20, such as paper 18. Ink jet or other types of printers 16 may provide a very affordable tool to create ink sublimation prints 12, which may then be transferred to a transfer substrate material 20. A printer cartridge containing special sublimation inks may be installed in the printer, thereby allowing transfer substrates 20 to be created. These transfer substrates 20 may then be applied to a desired substrate 24 and the ink transferred to the substrate 24 by heat, pressure, and, the like.

A substrate 24, such as stone, concrete, brick, or other masonry, as well as the other natural and synthetic materials heretofore mentioned, may be prepared with a liquid coating 26 of the polymer mentioned herein which permits the acceptance of a sublimation ink transfer. The surface of the substrate 24 may be prepared by cleaning, roughening, polishing, or the like, before applying the liquid coating 26 of the acrylic polyol of isocyanate resin or mixtures thereof. Once a suitable surface is provided, this liquid coating 26 may be applied to the substrate 24 by any suitable method, including but not limited to brushing 28, spraying 30, wiping, dipping, and the like. In certain embodiments, the liquid coating 26 may penetrate into the substrate 24, or in other embodiments, may only adhere to the surface thereof.

Once applied, the liquid coating 26 formed from the acrylic polyol or isocyanate resin, or mixtures thereof, is allowed to cure by any suitable method, including but not limited to drying, hardening, absorbing, reacting with a catalyst, and the like. Through the use of the coating 26 of this invention, the inks which sublimate into the liquid coating 26, are able to penetrate past the surface of the substrate, creating an image 12 fused into the substrate 24 and not easily removed or worn therefrom.

In other embodiments, the liquid coating 26 may only be partially absorbed by the substrate 24, and may be partially overlaid on the surface thereof. In other embodiments, the liquid coating 26 may by substantially overlaid completely on the surface thereof, while adhering to the substrate 24 and yet maintaining the substrate's natural appearances, especially color, clarity, and reflectivity. The color of a material is defined by frequencies that are filtered, emitted, or absorbed by the material from natural white light (e.g., all wavelengths). Likewise, the clarity of a material refers to the percentage of light incident on the material that is transmitted through the material. The reflectivity of a material refers to the percentage of light incident on a material that is reflected from the material. Moreover, portions of the substrate 24 covered by the coating 26 may be rendered visually indistinguishable from the substrate 24 by selection of these properties.

Once the liquid coating 26 is applied to a substrate material 24, sublimation inks are amalgamated or fused into the coating 26 to create a desired image 12 on the substrate 24. Any method used to achieve this end is within the scope of the present invention, including but not limited to traditional sublimation techniques, fusing the ink and polymeric material by melting, and the like. For example, once a suitable coating 26, or polymer 26 is applied to a substrate 24, the substrate 24 may be placed into a heat press 22 along with the transfer substrate 20 printed with the image 12. The heat press 22 may then be applied to the substrate 24 and accompanying transfer sheet 20. In this embodiment, heating may be used to sublimate the ink from the transfer sheet 20, by converting the ink directly from a solid to gas.

Meanwhile, the same heat and pressure can open the pores of the coating 26, and this substrate allowing the gas to enter. The heat and pressure may then be removed, thereby allowing the pores to close, converting the ink back from a gas to a solid, and trapping the ink within the pores of the substrate. Thus the ink may actually fuse into the polymeric coating 26. Once this process is complete, the substrate 24 may be removed from the heat press 22. The transfer substrate 20 may then be removed to leave the ink amalgamated into the substrate 24.

The methods in accordance with the present invention need not be limited to the substrates 24 mentioned in the previous description. Indeed, any substrate 24 that may accept a suitable coating 26, or polymer 26, having the properties hereinbefore described, and for which a natural appearance is desired, may benefit from methods in accordance with the invention. Examples of substrates 24 that may benefit from methods in accordance with the invention may include but are not limited to metal, ceramics, cloth, plastic, glass, wood, composites, leather, rubber, fiberglass, polymeric materials, any porous material, and the like. Hereinafter, any mention of particular substrates, such as stone, is intended to include any of the materials hereinbefore described, including any porous material.

In accordance with the foregoing discussion, an ink substrate 20 may be prepared to include an image 12, or images 12. New methods of using common printers, such as ink jet printers, have been developed to provide an affordable and simple method of producing sublimation ink prints. Similarly, relatively inexpensive graphic software, scanners, computers, and the like, may provide the tools necessary to edit, manipulate, and produce high quality images.

Figure 3:
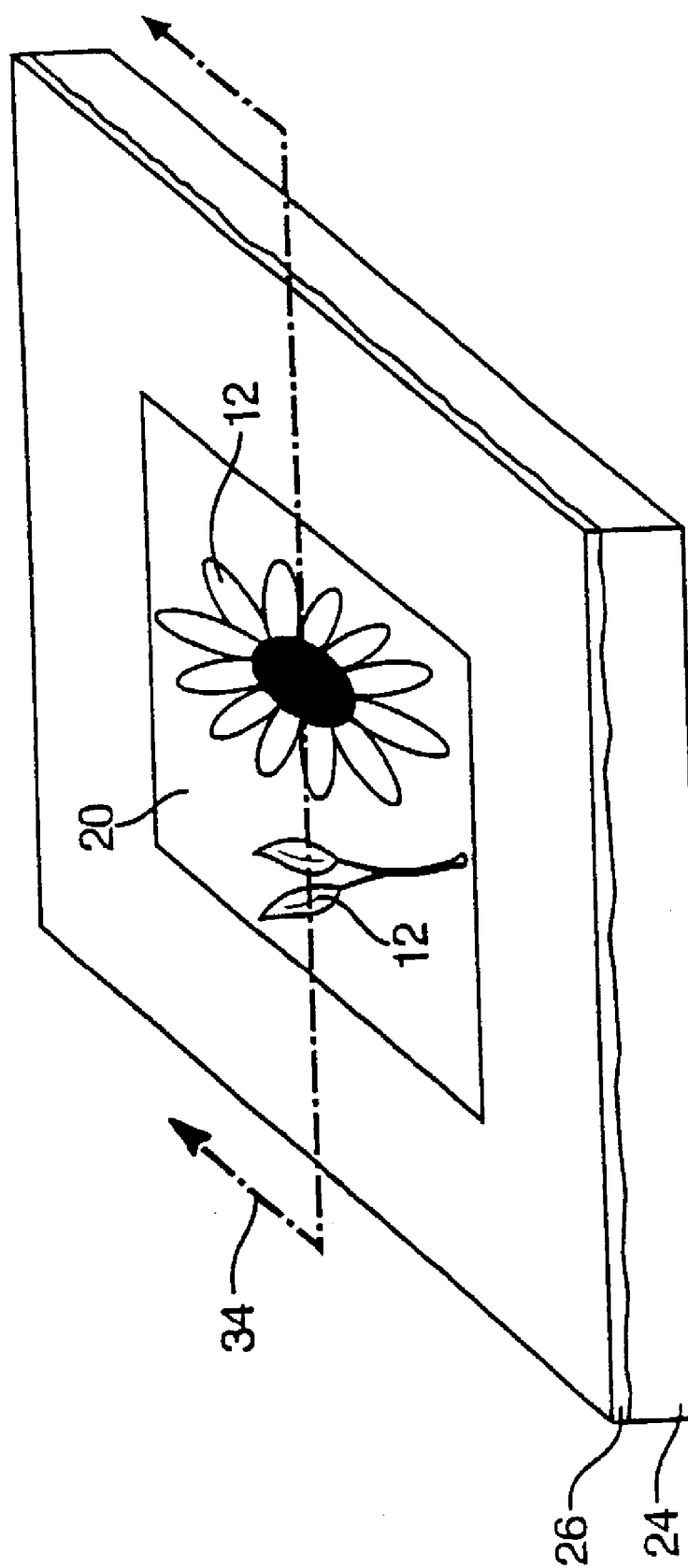
FIG. 3 is a perspective view of an ink substrate and polymer applied to a stone layer in accordance with the present invention.

Referring to FIG. 3, the polymer 26 may be applied to a substrate such as stone 24 by brushing, spraying, dipping, wiping, and the like, and may actually penetrate into the surface of the stone 24. The polymer 26 may then be cured by any suitable technique including heat, solvent drying, Ultraviolet, or the like. After an image 12 is selected and printed on a substrate material 20, such as paper 20, the substrate 20 may be applied to the polymer 26. The image 12 may then be transferred from the substrate 20 the polymer 26 using a sublimation process.

Figure 4:
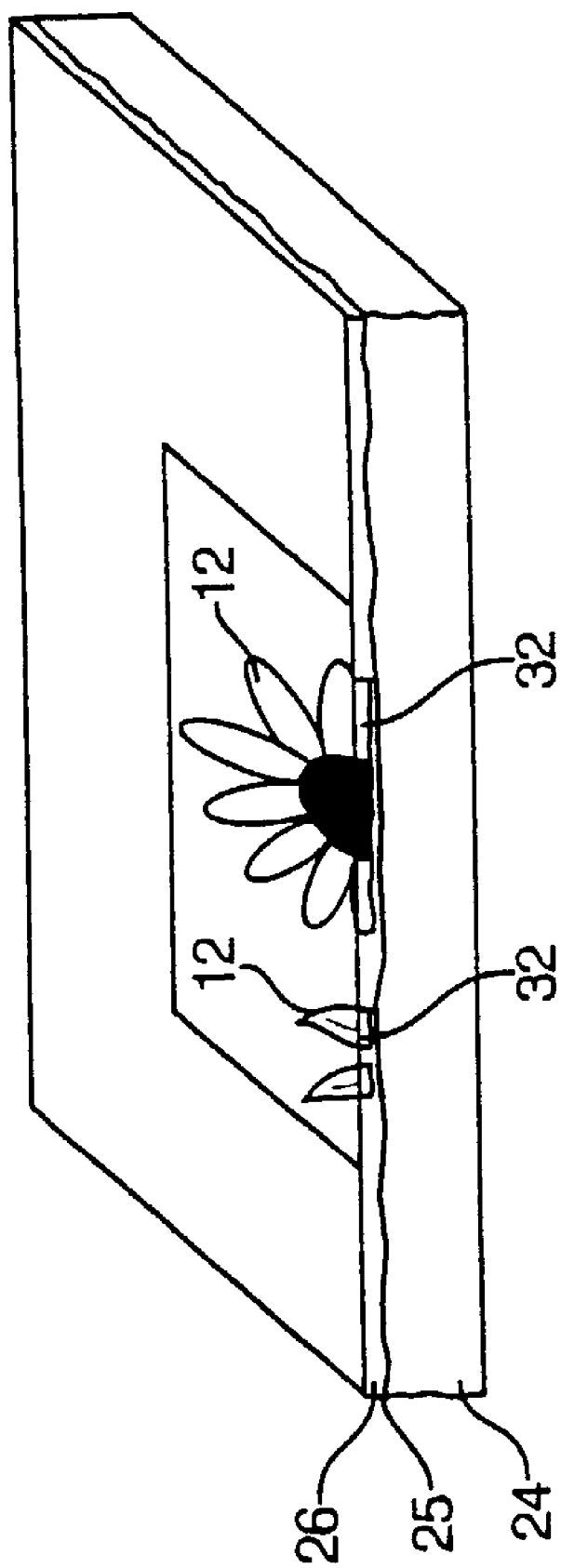
FIG. 4 is a perspective cross-sectional view of sublimation ink and polymer penetration into stone.

Referring to FIG. 4, a cross-sectional view 20 may be used to illustrate the penetration of both the polymer 26 and image 12 into a substrate surface such as stone 24. Because of the porous and inconsistent nature of some stones 24 or other porous materials 24, the depth of penetration 25 of the polymer 26 into the stone 24 may vary. Nevertheless, a desired average depth of penetration 25 may be achieved across the stone surface 24.

Figure 5:
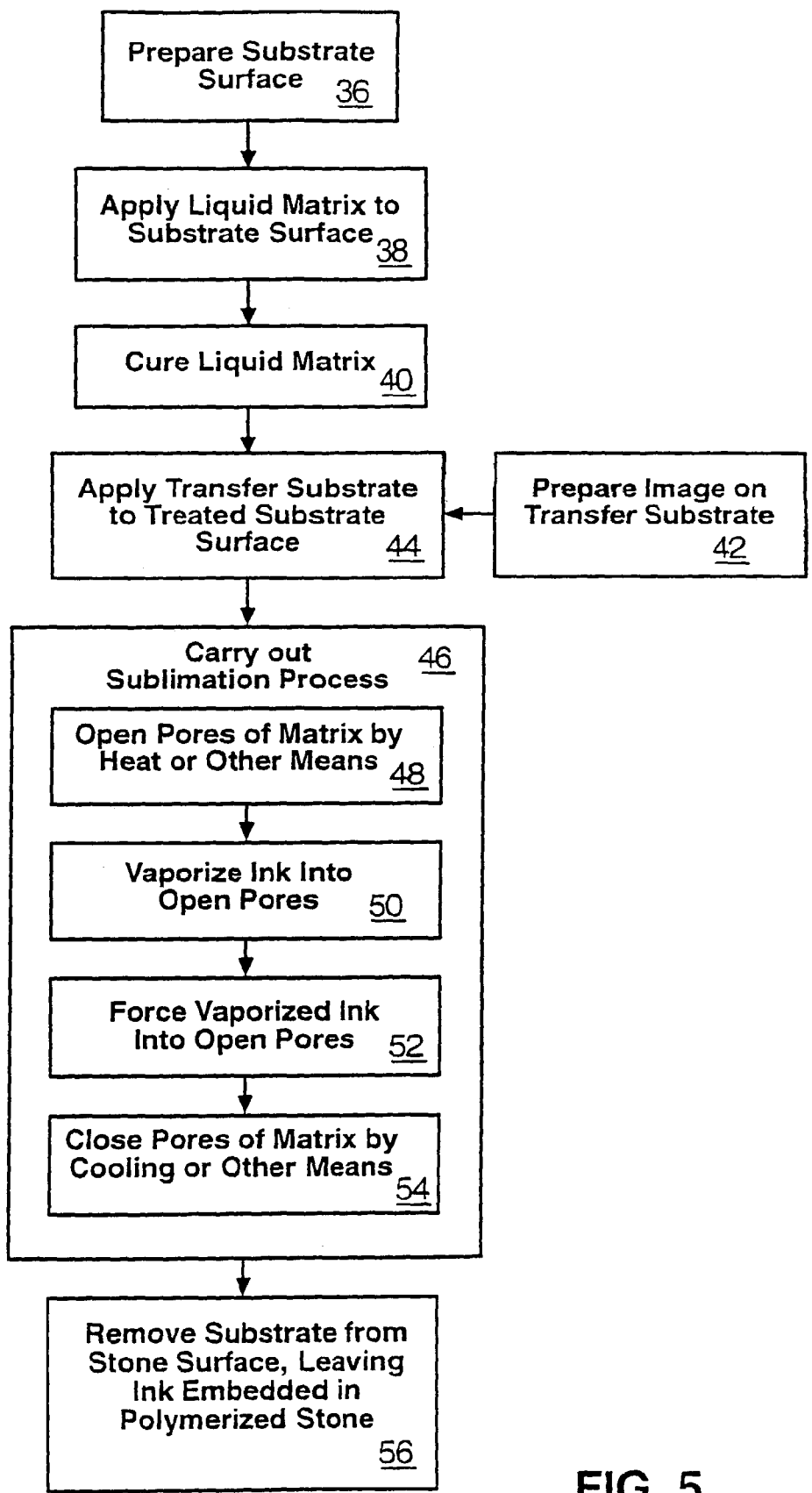
FIG. 5 is a flow chart of one embodiment of a process used to apply the ink and polymer to a stone surface.

Referring to FIG. 5, a process 35 may be followed in accordance with the present invention. Initially, a substrate 24 may be prepared 36, such as by cleaning any dust, particles, oil, or residue from the surface of the substrate 24, which can be stone, to maximize the bonding of the polymer 26 thereto. In addition, the surface of the stone 24 may be polished, etched, textured, or the like to a desired finish.

Once the surface of the substrate 24 is prepared 36, a liquid coating 26 may be applied 38 using any of the methods previously described, including but not limited to spraying, brushing, dipping, wiping, and the like. The liquid coating 26 may be applied 38 with sufficient volume and duration in order to allow the liquid resin coating 26 to sufficiently penetrate the surface 24. The coating may penetrate the porosity of the stone, the texture of the stone, or both. After the liquid coating 26 is applied 38, it may be cured 40 using conventional curing methods including but not limited to curing in the open air, forced air, heat, catalysts, ultraviolet light, solvent evaporation, or the like.

Once the liquid coating is fully cured 40, a transfer sheet 20 comprising sublimation inks may be applied 44 to the substrate 24. The sublimation process 46 may then be carried out using any suitable method. Heat may be applied 48 to the ink on the sheet 20, thereby opening the pores of the polymer 26, or liquefying the polymer 26, in order to facilitate the fusing of the ink 12 into the polymer 26 and onto the substrate. The heat can simultaneously cause the ink to sublimate 50, i.e., convert 50 from a solid into a gas. In some cases, pressure may also be applied 52 to trap and urge the ink 20 into the polymeric material 26 and into the substrate. In other embodiments, solvents may be used to transfer the ink 12 from the substrate 20 to the polymer 26. After the polymer 26 is cooled 54, the pores may close and the substrate may be removed 56, leaving the ink 12 amalgamated into the polymer 26.

Figure 6:
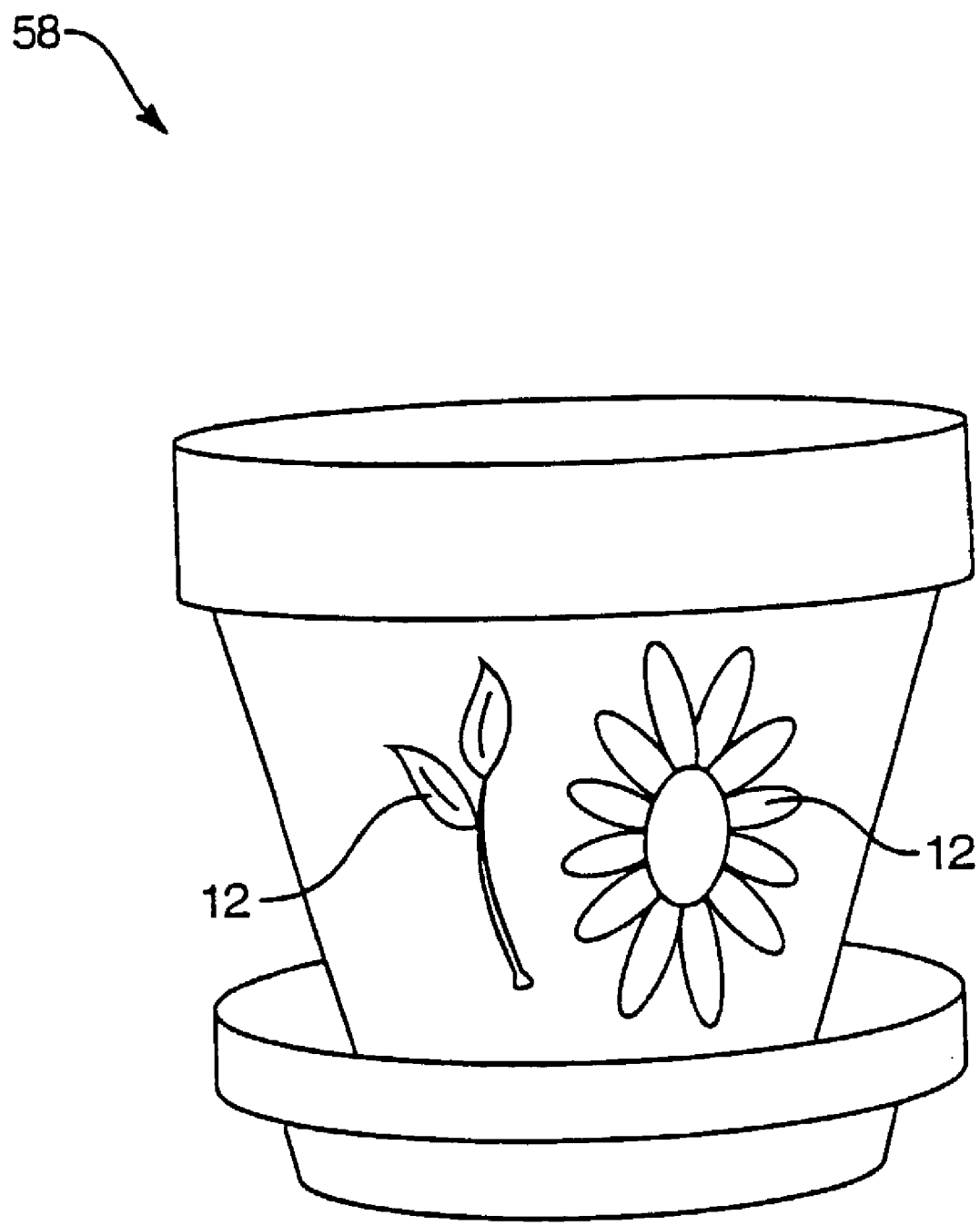
FIG. 6 is a perspective view of one embodiment of an image comprised of sublimation inks applied to a pot or ceramic container.

Referring to FIG. 6, methods in accordance with the present invention may be used to decorate a variety of different masonry items, including but not limited to clay pots 58, ceramics, sculptures, park benches, walls, counters, floors, and the like. The image 12 may be very durable and be especially suitable in outdoor environments that are subject to harsh weather conditions.

Figure 7:
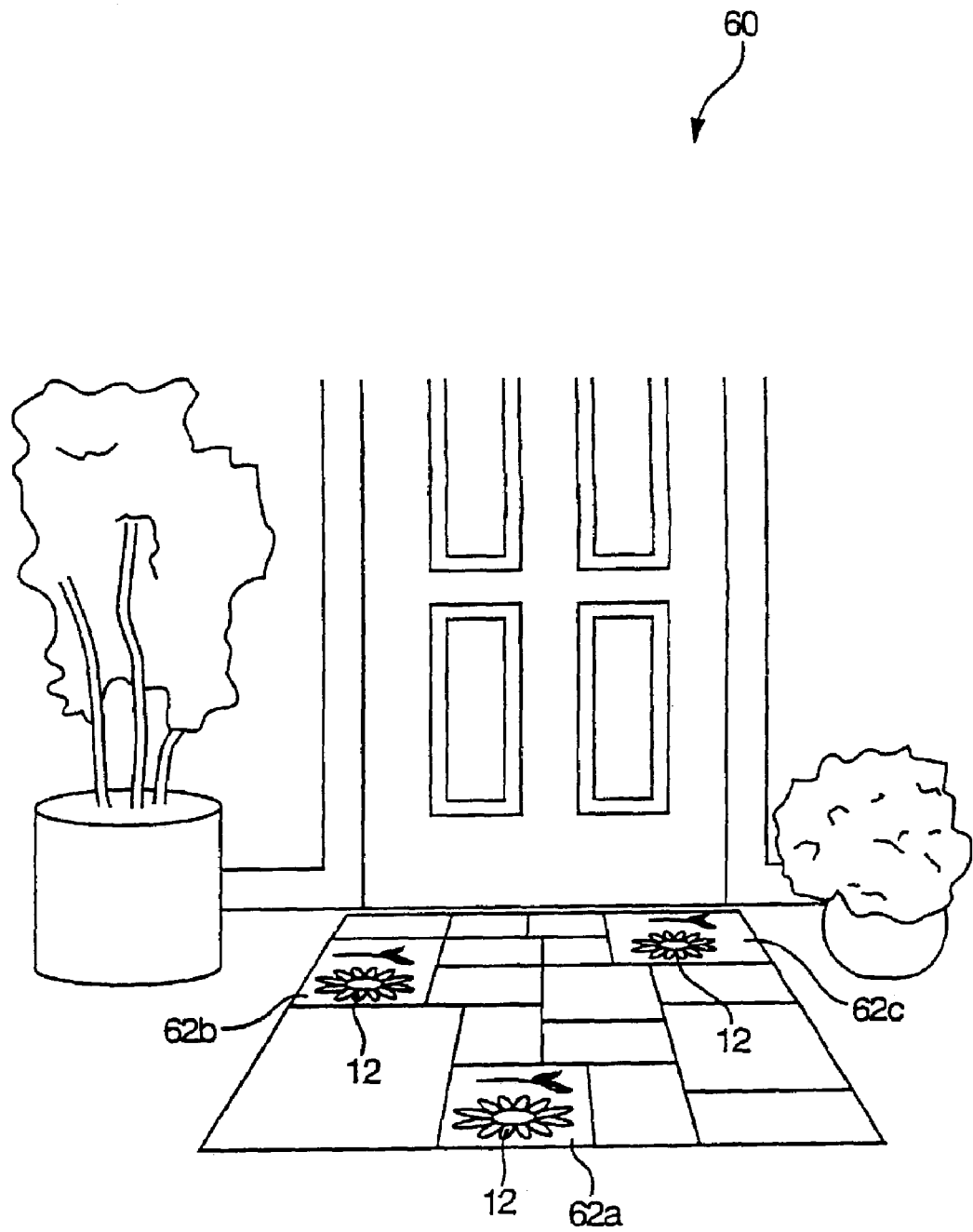
FIG. 7 is a perspective view of one embodiment of images comprised of sublimation inks applied to tiles in an entryway.

Referring to FIG. 7, methods in accordance with the present invention may be used to print durable images along a walkway, such as an entryway 60. Likewise, sidewalks, driveways, and the like may benefit from methods in accordance with the present invention. For example, durable and wear-resistant images 12 may be printed on masonry surfaces such as brick, tile, concrete, stone surfaces, and the like, while maintaining the natural appearance thereof.

Figure 8:
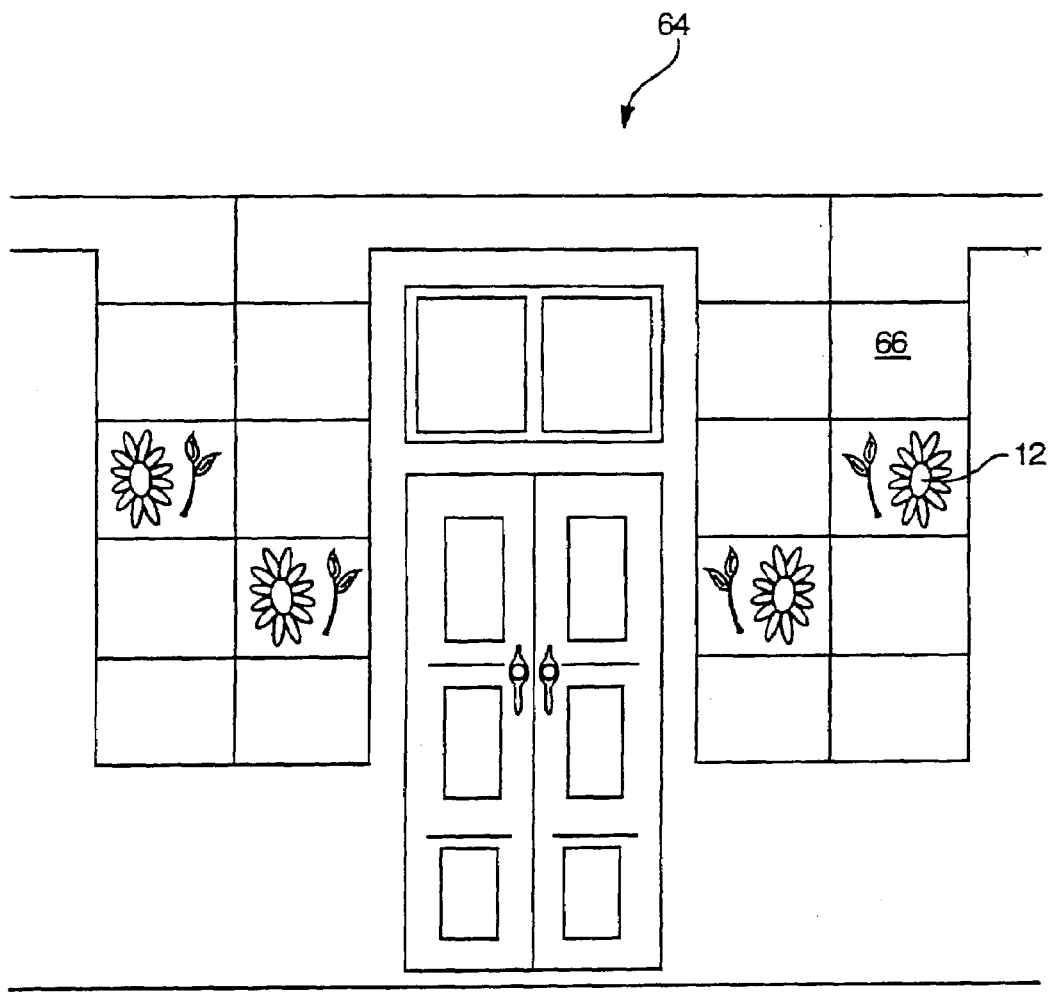
FIG. 8 is a perspective view of one embodiment of images comprised of sublimation inks used to decorate walls around an entryway.

Referring to FIG. 8, methods in accordance with the invention may be used to print durable images on all types of masonry and porous surfaces including the walls 66 of a building. For example, images 12 may be used to decorate an area around a doorway 64 or entryway 64, indoors or outdoors, and may resist weather, abrasion, and the like. Images 12 may be printed on all types of masonry as well as other porous surfaces including but not limited to bricks, tiles, concrete, stone surfaces, and the like.

Figure 9:
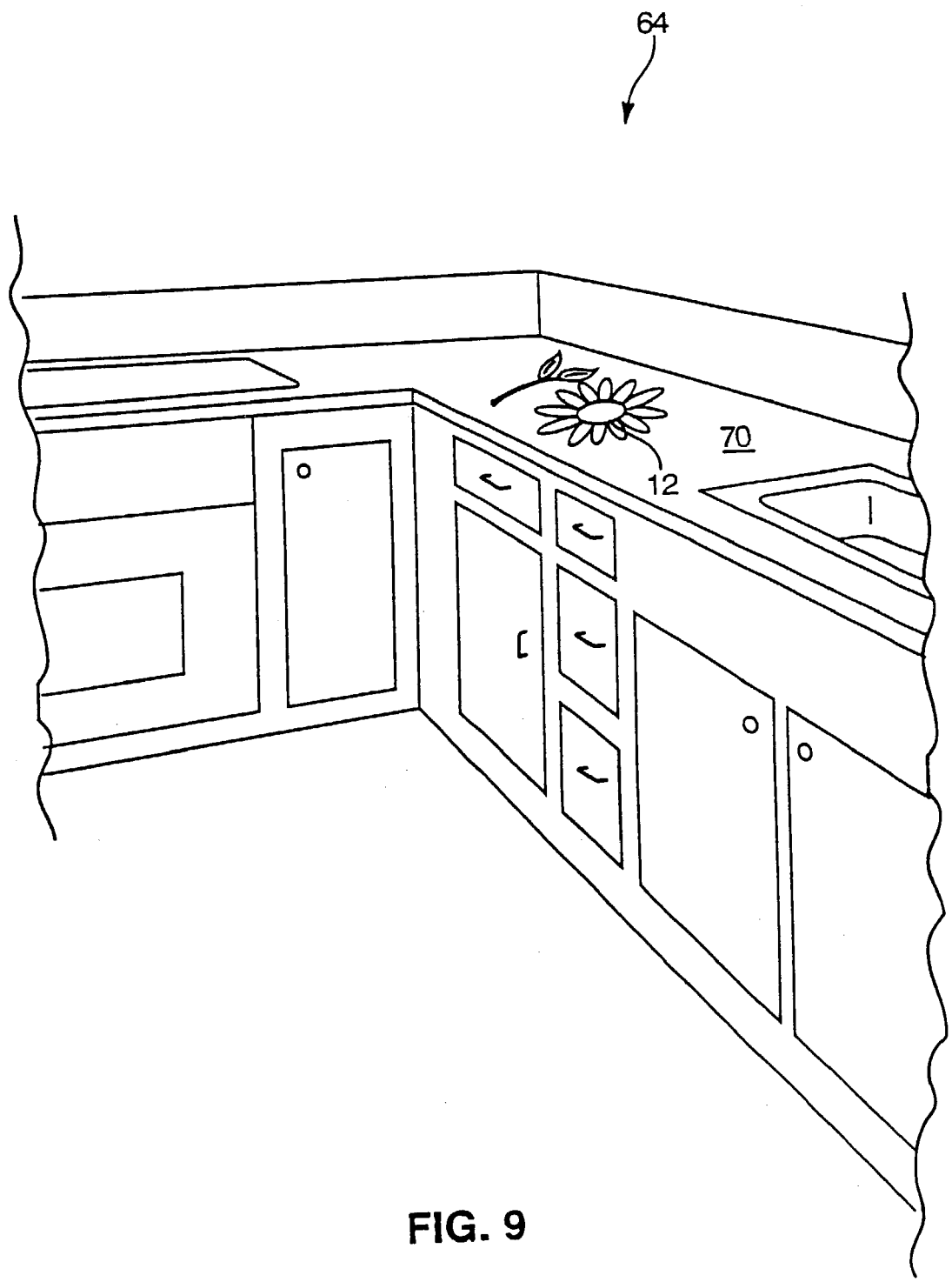
FIG. 9 is a perspective view of one embodiment of an image comprised of sublimation inks applied to a countertop.
Figure 10:
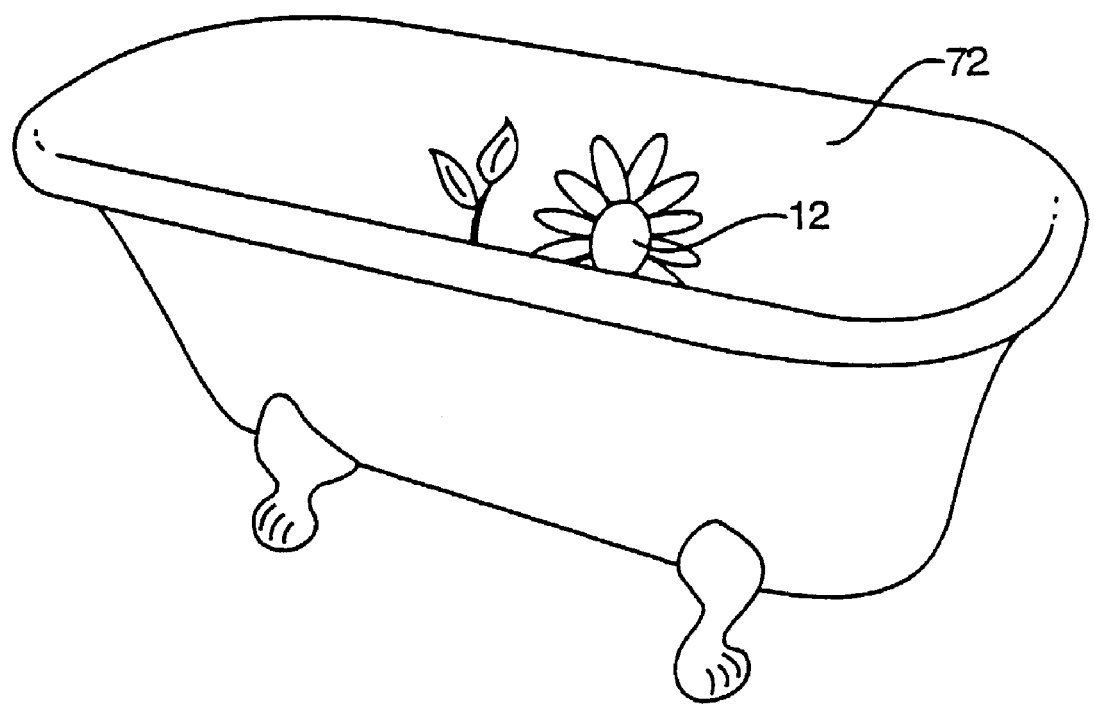
FIG. 10 is a perspective view of one embodiment of an image comprised of sublimation inks applied to a bathtub.

Referring to FIGS. 9 and 10, methods in accordance with the invention may be used to print durable images 12 on a wide variety of household applications 68, such as countertops 70, sinks, floors, walls, bathtubs 72, showers, pools, patios, outdoor furniture, stonework, and the like. If such surfaces are formed initially with suitable substrates 24 or matrices 26, they can be decorated in situ, after installation. Large murals and patterns may then be possible. Otherwise, the coating 26 may be applied in situ as well, or the entire processes hereinabove may occur at a factory producing building materials.

The present invention may be embodied in other specific forms without departing from its essential characteristics. The described embodiments are to be considered in all respects only as illustrative, and not restrictive. All changes that come within the meaning and range of equivalency of the description are to be embraced within their scope.

The invention claimed is:

1. A process for printing a durable image on a substrate comprising:
   (a) providing a porous substrate having a porous surface on which a durable image is to be printed;
   (b) providing a transferable sublimable ink image transfer sheet bearing an image to be printed formed from sublimable inks;
   (c) providing on said porous surface of said porous substrate a transparent polymeric coating formed from a resin of acrylic polyol that, upon curing, provides a hard and durable polymeric coating that is uv-resistant and which receives and retains a sublimable ink image therethrough;
   (d) contacting the durable polymeric coating formed on said porous surface with said transfer sheet with said sublimable ink image positioned against said durable polymeric coating; and
   (e) transferring said sublimable ink of said image from said transfer sheet to the durable polymeric coating and pores of said porous substrate by sublimation whereby the image penetrates and fuses into the porous substrate to provide a subsurface image formed in said porous substrate that wears only at the same rate as the porous substrate to maintain the integrity of the image.

2. The process of claim 1 wherein said transfer sheet is paper.

3. The process of claim 1 wherein said polymeric coating is applied to said porous substrate by spraying, brushing, dipping or wiping the liquid resin onto a surface of the porous substrate and allowing said resin to cure.

4. The process of claim 1 wherein the sublimation is carried out at temperatures which allow the pores of the porous substrate to become embedded with said polymeric coating and sublimable ink so that the image penetrates into the pores of said porous substrate.

5. The process of claim 4 wherein the sublimation is carried out at a temperature of from about 70° C. to about 250° C.

6. The process of claim 5 wherein the sublimation is carried out at a temperature of from 70° C. to about 150° C.

7. The process of claim 1 wherein said polymer coating is further formed from said acrylic polyol cross linked with a polyisocyanate.

8. The process of claim 1 wherein said porous substrate is a hardened natural or manufactured material.

9. The process of claim 8 wherein said porous substrate material is stone, masonry, ceramics, tile or marble.

10. The process of claim 9 wherein said polymeric coating is applied to said porous substrate by spraying, brushing, dipping or wiping the liquid resin onto the surface of the porous substrate and allowing said resin to cure.

11. The process of claim 10 wherein the sublimation is carried out at temperatures which allow the pores of the porous substrate to become embedded with said polymeric coating and sublimated ink so that the image penetrates into the porous substrate.

12. The process of claim 11 wherein said sublimation is carried out at a temperature of from about 150° C. to about 250° C.

13. The process of claim 11 wherein said polymeric coating is further formed from said acrylic polyol cross linked with a polyisocyanate.

14. The process of claim 1 wherein said porous substrate that is coated with said transparent polymeric coating formed from a resin of acrylic polyol is a polymeric material into the pores of which said image is embedded to provide said substrate image that wears at the same rate as the polymeric porous substrate.

15. The process of claim 14 wherein said transfer sheet is paper.

16. The process of claim 15 wherein said polymeric coating is applied to said porous substrate by spraying, brushing, dipping or wiping the liquid resin onto the surface of the porous substrate and allowing said resin to cure.

17. The process of claim 16 wherein the sublimation is carried out at temperatures which allow the pores of the material porous substrate to become embedded with said polymeric coating and said sublimated ink such that the image penetrates into the substrate.

18. The process of claim 17 wherein the sublimation is carried out at a temperature of from about 70° C. to about 150° C.

19. The process of claim 17 wherein said acrylic polyol is cross linked with a polyisocyanate resin.

20. A process for printing a durable image on a substrate comprising:
providing an image transfer sheet bearing an image formed from sublimable inks;
providing a substrate of hardened natural or manufactured building material on which said image is to be printed, said substrate having surface pores;
providing a polymeric resin selected from the group consisting of acrylic polyol resins, polyisocyanate resins, and mixtures thereof;
forming a UV protective coating on said substrate and in said surface pores of said substrate using said polymeric resin in sufficient thickness to produce a hardened, durable coating on said substrate which, when cured, is able to withstand weather and abrasion and which receives and retains a sublimable ink image therethrough;
positioning said image transfer sheet on said transparent durable coating with said sublimable ink image in contact with said transparent durable coating; and
transferring said sublimable ink image to said transparent durable coating by sublimation so that said sublimable ink forms an image that penetrates and fuse into in said surface pores of said substrate to produce a subsurface image in said substrate that wears only at the same rate of degradation as said substrate to thereby maintain the integrity of said image.

21. The process of claim 20 wherein said substrate comprises a natural earth material.

22. The process of claim 20 wherein said substrate is a natural earth-containing material selected from the group consisting of stone, masonry, ceramics, tile or marble.

23. The process of claim 20 wherein said sublimation is carried out at temperatures sufficient to allow the sublimable ink to penetrate into said surface pores of said substrate to effect embedding of said sublimable ink image into said surface pores of said substrate.

24. The process of claim 20 wherein said polymeric resin is an acrylic polyol.

25. The process of claim 20 wherein said polymeric resin is an acrylic polyol cross linked with a polyisocyanate resin.

26. The process of claim 20 wherein said polymeric resin is a polyisocyanate.

27. The process of claim 20 wherein said substrate comprises wood.

* * * * *